Patented May 10, 1938

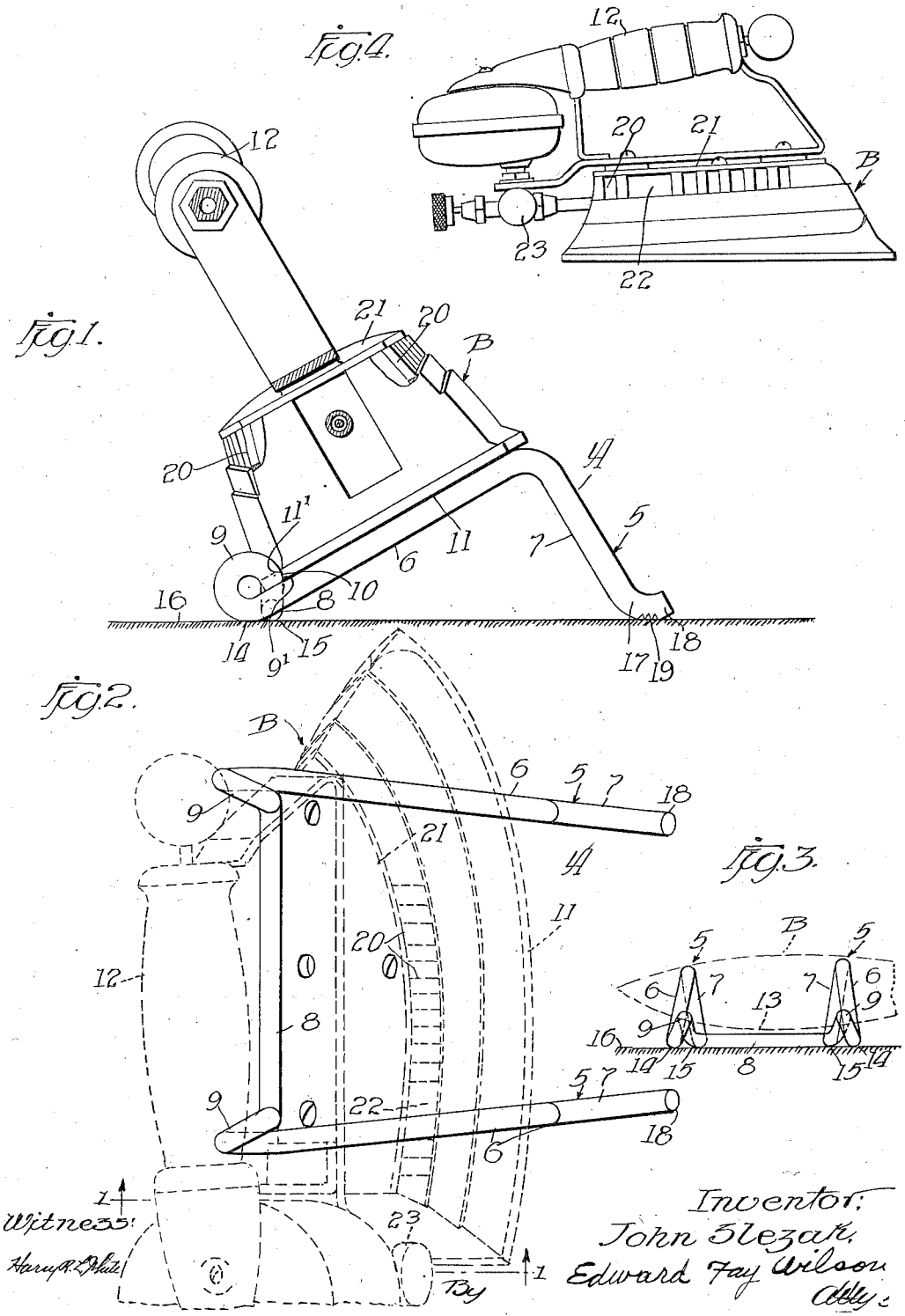

2,117,042

UNITED STATES PATENT OFFICE 2,117,042

FLATIRON SUPPORT

John Slezak, Sycamore, Ill., assignor to Turner Brass Works, Sycamore, Ill., a corporation of Illinois Application June 13, 1936, Serial No. 85,055

4 Claims. (Cl. 248—117.2)

This invention relates to an improved flat-iron stand and has especial reference to a stand for use in connection with flat-irons which are self heating.

The usual hand flat-iron has a handle which extends longitudinally and centrally above the top of the body of the iron.

When the iron is placed on the usual horizontal flat stand the heat from the body of the iron rises directly up against the handle with the result that frequently the handle becomes so hot as to be uncomfortable to grasp. Furthermore in the case of gasolene heated irons, which are set in horizontal position either while becoming hot enough for use or between periods of actual use, the gases of combustion, as they rise from the two sides of the iron, curve inwardly from both sides and impinge upon the handle thus frequently highly heating the handle. This not only makes it unpleasant to grasp the handle but may frequently so impair the handle that it must be repaired.

By means of my improved stand I am enabled not only to prevent such undesirable heating of the handle while the iron is thereon, but the handle actually cools off when placed on the stand during ironing and further by the use of said stand other important advantages accrue especially when the stand is used to support a gasolene heated iron.

The invention will be more readily understood from the accompanying drawing, forming part of this specification, taken in conjunction with the following description and the appended claims.

In said drawing:—

Fig. 1 is an end view of a stand embodying my invention in a preferred form and also an end sectional view on the line 1—1 of Fig. 2, of a gasolene heated iron shown resting on the stand;

Fig. 2 is a top plan view of the stand and iron as shown in Fig. 1, the stand being in full lines and the iron in dotted lines;

Fig. 3 is a reduced side elevation of the stand in full lines and a flat-iron shown thereon in dotted outline as seen from the left side of Fig. 1; and Fig. 4 is a side elevation of a gasolene heated flat-iron in conjunction with which my improved stand is especially useful.

The preferred form of my invention, as shown in the drawing, is a very simple structure. It is preferably formed up out of a relatively heavy wire rod, in actual use preferably about one quarter of an inch in diameter, to provide sufficient rigidity for the use and abuse to which it may be subjected and not be bent out of shape.

The stand is designated generally by A and the flat-iron by B. The stand is formed to provide an inverted V-shaped supporting part 5 at each end, comprising one part or leg 6 which is inclined upwardly at preferably an angle of about 30 degrees to the horizontal and a second part of leg 7 inclined downwardly at about a right angle to the part 6. These two end parts 5 are rigidly connected together by a horizontal part 8 which preferably joins the lower ends of the parts or legs 6.

Preferably the rod of which the stand is made is formed into circular rests 9 at the connections between the end parts 6 and the connecting bar 8, the upper portions providing shoulders 10 against which the flat-iron rests when placed on the stand with its bottom polished surface 11 resting in contact with the upward inclined leg parts 6. As shown this manner of supporting the iron places the body part in a sidewise inclined position and the handle 12 of the iron is placed above one side edge of the iron rather than centrally above same.

The circular rest 9 projects out from the leg part 6, which is substantially tangent to the rear side of the rest 9 and consequently the construction provides what may be termed a V-notch 9' between each rest part 9 and the adjacent leg part 6 adapted to receive the lower outer edge 11' of the iron.

This arrangement securely holds the iron against possible accidentally falling off of the rest once it has been placed thereon.

The sides of the iron are usually of convex form longitudinally and, as best shown in Fig. 3, the middle portion 13 of the body of the iron depends slightly between the end supporting shoulders 10 thus providing a support for the iron from which it is not easily accidentally displaced as it depends between the rest points.

The lower sides 14 of the ring like connecting parts and the lower side 15 of the connecting rod are of course rounded and are arranged to contact with the surface 16 upon which the stand is supported. This surface 16 is usually the top, cloth covered, surface of the ironing board and such rounded and smooth surfaces 14 and 15, which particularly carry the weight of the iron, do not tend to cut into or otherwise damage said cloth covered surface.

The lower ends of the leg parts 7 are curved outwardly as shown at 17 to provide ample supporting surfaces 18 at these points, and to prevent the stand from sliding to the right when the iron is placed thereon the contacting surfaces 18 are provided with a plurality of V-shaped cross cuts 19 arranged to provide teeth with rather dull non-cutting edges but sufficient for the purpose.

Usually gasolene heated flat-irons have a row of openings 20 at each side and just below the top surface 21 of the iron B.

These openings are for the purpose of permitting the escape of the gases of combustion. It is to be noted that when the iron is on the stand it is inclined sidewise. In this position the gases of combustion flow out at the upper side of the iron through the openings 20 and, on account of the inclination, air flows into the body of the iron through the openings 20 at the lower side of the iron. This results in the quicker expulsion of the burnt gases and a quicker preliminary heating of the iron which preliminary heating period is reduced several minutes in actual practice.

Not only is the beneficial result above spoken of attained but in addition it is found that certain irons which, for some reason, it is difficult to start into operation, when in horizontal position, are readily started when supported in inclined position as shown.

Such irons are usually started by inserting a lighted match through an opening at one side. Such an igniting opening is shown at 22 and which is arranged to be positioned on the upper side when the iron is placed on the stand. Obviously when placed in such position the starting or igniting match can be more readily properly inserted if necessary than when the iron is horizontal in position.

In practice, however, I find that the burner in the iron can be ignited by merely holding the lighted match outside of the ignition opening 22. The gasolene iron illustrated has an instant ignition control valve 23 which has a handle arranged projecting out from the iron on the same side as the ignition opening 22 and consequently when the iron is placed in tilted position on the stand this valve is easier to reach and adjust than when the iron is in a horizontal position.

It is to be noted that the lower edge portion 13 of the iron is held above the stand supporting surface 16 sufficiently so that no danger of scorching the cloth cover can occur.

The stand being made of wire and the iron having only the slight contact that it has with the stand the loss of heat from the iron to the stand is reduced to a practical minimum.

It is a usual practice of those using such irons to test whether or not they are hot enough for the purpose, by touching the dampened fingers to the bottom of the iron. My improved stand makes it very convenient to apply this test to the iron as the bottom 11 is raised from the support 16 sufficiently to readily admit the fingers beneath the iron, and the iron does not have to be tipped up by hand for this purpose.

An obvious advantage in the use of the support upon which the iron is placed in transversely inclined position, when the flat-iron is of the liquid fuel type, is to cause a cross draft through the iron thus assisting to quickly remove the gases of combustion and also as the handle is out of the direct line of travel of these hot gases, as they rise from the iron, the handle is not heated, but remains cool.

Such is obviously not the case when the iron is set horizontally on a flat stand, between periods of actual use of the iron.

As many modifications of the invention will readily suggest themselves to one skilled in the art I do not limit or confine the invention to the specific details of construction herein shown and described except within the scope of the appended claims.

I claim:

1. A flat-iron rest comprising a frame including two L-shaped parts disposed in substantially vertical, parallel planes and having longer front legs than rear legs, a stop part extending from the end of the longer leg of each L-shaped part, and a cross part extending between and joining the lower ends of said longer legs.

2. A flat-iron rest as defined in claim 1, in which the frame consists of a single wire, and said stop parts are substantially circular and disposed in substantially vertical planes.

3. A flat-iron rest as defined in claim 1, the free ends of the shorter legs being curved and roughened on their undersides.

4. A flat-iron rest as defined in claim 1, the free ends of the shorter legs being curved and provided with transverse teeth on their under sides.

JOHN SLEZAK.